US008745491B2

(12) United States Patent
Karn et al.

(10) Patent No.: US 8,745,491 B2
(45) Date of Patent: Jun. 3, 2014

(54) DETERMINING EVENT PATTERNS FOR MONITORED APPLICATIONS

(75) Inventors: Holger Karn, Boeblingen (DE); Michael Reichert, Boeblingen (DE); Michael Roehle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/975,171

(22) Filed: Dec. 21, 2010

(65) Prior Publication Data
US 2012/0011439 A1   Jan. 12, 2012

(30) Foreign Application Priority Data
Dec. 22, 2009   (EP) .................................... 09180324

(51) Int. Cl.
*G06F 3/00*  (2006.01)
*G06F 9/44*  (2006.01)

(52) U.S. Cl.
USPC ............................. 715/704; 717/124; 717/125

(58) Field of Classification Search
USPC ................................... 715/704; 717/124, 125
See application file for complete search history.

(56) References Cited

U.S. PATENT DOCUMENTS

| | | | |
|---|---|---|---|
| 2002/0198984 A1* | 12/2002 | Goldstein et al. | 709/224 |
| 2004/0261026 A1* | 12/2004 | Corson | 715/704 |
| 2005/0278630 A1* | 12/2005 | Bracey | 715/704 |
| 2008/0172419 A1* | 7/2008 | Richards et al. | 707/200 |

OTHER PUBLICATIONS

OpenSTA Modeling Scripts Apr. 28, 2003 24 pages.*
"IBM Information Management Software for z/OS Solutions Information Center" available at: http://publib.boulder.ibm.com/infocenter/dzichelp/v2r2/index.jsp?%20topic=/com.ibm.db29.doc.perf/db2z_responsetimereports.htm, last accessed Dec. 21, 2010, 1 page.

* cited by examiner

*Primary Examiner* — Andrea Long
(74) *Attorney, Agent, or Firm* — Jeffrey T. Holman

(57) ABSTRACT

A method, system, and computer program product for providing information of a monitored system through a graphical user interface (GUI) of a monitoring application to support simplified or automatic identification of events. The method includes, among other possible operations, initiating an event pattern script recording. The method also includes keeping track of user actions on said GUI and on activated GUI panels during said event pattern script recording by requesting a user to specify, once the user activates a further GUI panel, which panel information in a current GUI panel triggered activation of said further GUI panel and based on what criterion the triggering occurred. The user specified information results in triggering information. The method also includes, in response to receiving an indication that an event has been identified, stopping said event pattern script recording. The method also includes, storing said event pattern script recording containing identification information identifying the event, GUI panel information about said activated GUI panels during said event pattern script recording and said triggering information.

9 Claims, 15 Drawing Sheets

Statistics Details for SDB2 — 1000

1002 — Group Buffer Pool Activity

1004 — PagesCastout

| Buffer Management | Group Buffer Pool Activity | | | | |
|---|---|---|---|---|---|
| ○ Castout Activity | GBP | | | PagesCastout | |
| ○ Group Buffer Pool Activity | GBP 0 | ~1003 | 1005 | 25 | |
| | GBP 1 | | | 1 | |
| 1001 | GBP 2 | | | 0 | |

1101 — Triggering criterion from Predecessor Panel

PagesCastout = MAX ( PagesCastout )

1102 — Objects relevant for Successor Panel

SubsystemId
GroupBufferPool

1103 — Actions for Successor Panel

DataFlowObj(SubsystemId) = SuccPanelObj(SubsystemId) AND
TOP_N(3, ChangedPagesWrittenToGBPs) AND
SORTBY(ChangedPagesWrittenToGBPs)

1104 — Comments

Identify the top-3 database threads changing most pages across all group buffer pools and running on the selected database member

Fig. 11

| Thread Summary | | | | |
|---|---|---|---|---|
| For Member | SDB2 | | | |
| | Member | ThreadId | ChgdPagesInGBPs | |
| | SDB2 | 0010 | 20 | |
| | SDB2 | 0011 | 4 | |
| | SDB2 | 0012 | 2 | |

DETERMINING EVENT PATTERNS FOR MONITORED APPLICATIONS

CROSS-REFERENCE TO RELATED APPLICATIONS

This application claims the benefit of priority of European Patent Application No. 09180324.7 entitled "Determining Event Patterns for Monitored Applications," which was filed on Dec. 22, 2009, and is hereby incorporated by reference.

BACKGROUND

A performance monitor is a computer program application that is used to monitor various activities on a computer such as usage of central processing units, memory, and network. The information gathered from such monitoring usually helps to determine the cause of problems on a local or remote computer by measuring the performance of hardware, software services, and applications.

As an example of conventional embodiments of a monitored system and a monitoring application, consider a database management system and a relating performance monitor. To give a concrete example, consider IBM® DB2®, which is a family of relational database management system (RDBMS) software products within IBM's broader Information Management Software line, and IBM Tivoli® OMEGAMON® XE for DB2 Performance Expert on z/OS®. The latter software product is a comprehensive assessment application, which can be used to evaluate the efficiency and optimize the performance of DB2 in a z/OS environment. This application helps to monitor, analyze, and tune the performance of IBM DB2 Universal Database and IBM DB2 applications on z/OS. It provides views of performance data so that an administrator can identify performance bottlenecks. A graphical user interface (GUI) displays much performance information about monitored DB2 database systems. Since there is a large amount of performance information about monitored objects that needs to be displayed to a DB2 administrator, there are many GUI panels in such a DB2 performance monitoring application.

When a monitored system has a specific problem, the administrator typically navigates from one GUI panel to another in a monitoring application and checks the displayed complex information for specific problem patterns to get all details about the performance problem until he has found the root cause of the problem. The selection of activated GUI panels may strongly depend on the specific problem and on the preferences and experiences of the administrator. Altogether, the navigation and problem analysis may be very time-consuming for the following reasons: GUI panels may have different layouts because they are related to different information categories. An administrator may find it difficult to correlate information on the distributed GUI panels and to identify the root cause. The user may spend unnecessarily long time on figuring out problems that are well-known. Moreover, knowledge about problem resolution strategies is always changing because it depends on the monitored system and individual user experience. Hence, there is a need to provide a dynamic and user-friendly way of simplifying problem resolution based on a plurality of GUI panels, where the resolution process takes into account repeatedly changing situations and individual user strategy.

SUMMARY

Embodiments of a method are described. In one embodiment, the method is a method for providing information of a monitored system through a graphical user interface (GUI) of a monitoring application to support simplified or automatic identification of events. The method includes, among other possible operations, initiating an event pattern script recording. The method also includes keeping track of user actions on said GUI and on activated GUI panels during said event pattern script recording by requesting a user to specify, once the user activates a further GUI panel, which panel information in a current GUI panel triggered activation of said further GUI panel and based on what criterion the triggering occurred. The user specified information results in triggering information. The method also includes, in response to receiving an indication that an event has been identified, stopping said event pattern script recording. The method also includes, storing said event pattern script recording containing identification information identifying the event, GUI panel information about said activated GUI panels during said event pattern script recording and said triggering information. Other embodiments of the method are also described. Embodiments of corresponding systems and apparatuses are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

For better understanding of the present embodiments of the invention and as how the embodiments may be carried into effect, reference will now be made by way of example only to the accompanying drawings in which:

FIGS. 5, 10, 12, and 14 illustrate GUI panels of a monitoring application according to an embodiment of the present invention.

FIGS. 6, 7, 8, 9, 11, 13, and 15 illustrate elements of navigation wizards displayed between the GUI panels according to an embodiment of the present invention.

Throughout the description, similar reference numbers may be used to identify similar elements.

DETAILED DESCRIPTION

Figure 1:
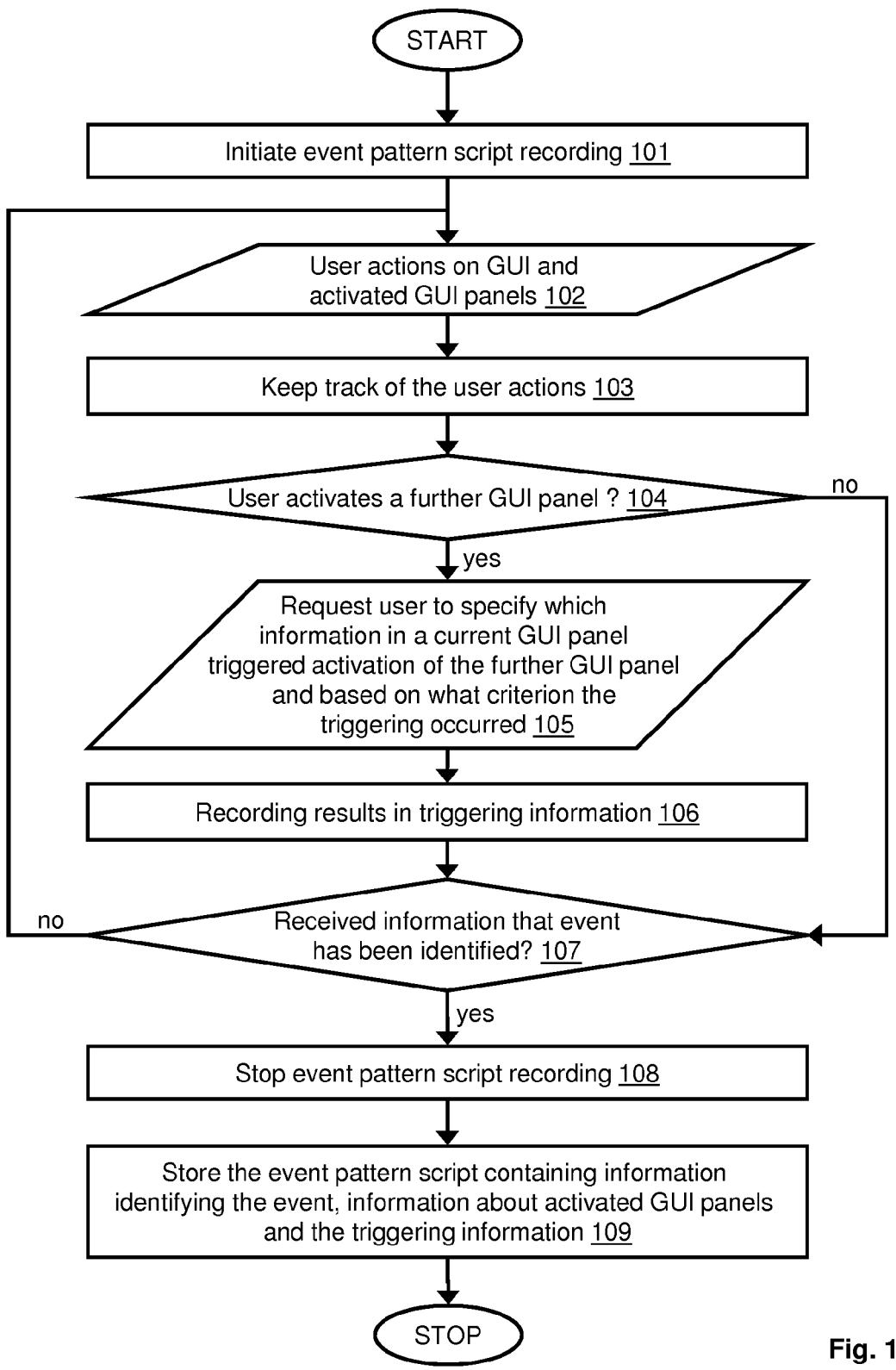
FIG. 1 illustrates a flow chart of a computerized method for providing information of a monitored system through a graphical user interface (GUI) of a monitoring application according to an embodiment of the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments provide a monitoring application or monitoring tool for creating event pattern information, which may be problem pattern information relating to performance problems. In some embodiments, this information is stored in scripts. In one embodiment, one script is associated with one event pattern. In another embodiment, one or more scripts are associated with one or more event patterns. When a user of a monitoring application encounters a performance problem or other event, the user may manually trigger the creation of these event pattern scripts. In one embodiment, these scripts may also be called problem pattern scripts. When the event re-occurs, the user can compare current monitored event information to the recorded event pattern scripts. It is also possible to trigger the comparison of the event pattern scripts automatically (for example, when a performance indicator of a monitored object is below or above a certain threshold value). In some embodiments, the monitoring application may check whether a current event matches a recorded pattern of a well known event. In the case of a match, one or more new GUI panels may be generated based on information from the event pattern script.

These generated GUI panels may contain the core information about the detected event in a compact format. If the current event does not match any information in the scripts describing a known event pattern, the user of the monitoring application is notified about this fact. Therefore, in some embodiments, the user at least knows that the current event that he faces is a completely new one. The automatic comparison of current monitored information to event pattern scripts to analyze a current event (for example, a user encountering a DB2 performance problem) may prevent the necessity of manual navigation through a large number of GUI panels of the monitoring application. Thus, in some embodiments, the user may save a large amount of time and finally accelerate the resolution of the performance problem.

FIG. 1 illustrates a flow chart of one embodiment of a computerized method for providing information of a monitored system through a graphical user interface (GUI) of a monitoring application. In one embodiment, in block 101, event pattern script recording is initiated. In block 102, user actions on the GUI and activated GUI panels are performed. In block 103, keeping track of the user actions is performed during the event pattern script recording. In block 104, testing is performed if a user activates a further GUI panel. In one embodiment, if the answer of the test is "no", blocks 105 and 106 are skipped, and execution continues at block 107. When the user activates the further GUI panel, processing continues at block 105. The user is requested to specify which panel information in a current GUI panel triggered activation of the further GUI panel and based on what criterion the triggering occurred. According to block 106, the event pattern script recording results in triggering information. In block 107, testing is performed order to determine if information has been received that an event has been identified. In the negative answer case, processing continues at block 102 to wait for further user actions. In the positive answer case, the event pattern script recording is stopped in block 108, and the event pattern script is stored in block 109. In one embodiment, the event pattern script contains identification information identifying the event, GUI panel information about activated GUI panels during the script recording and the triggering information.

Figure 2:
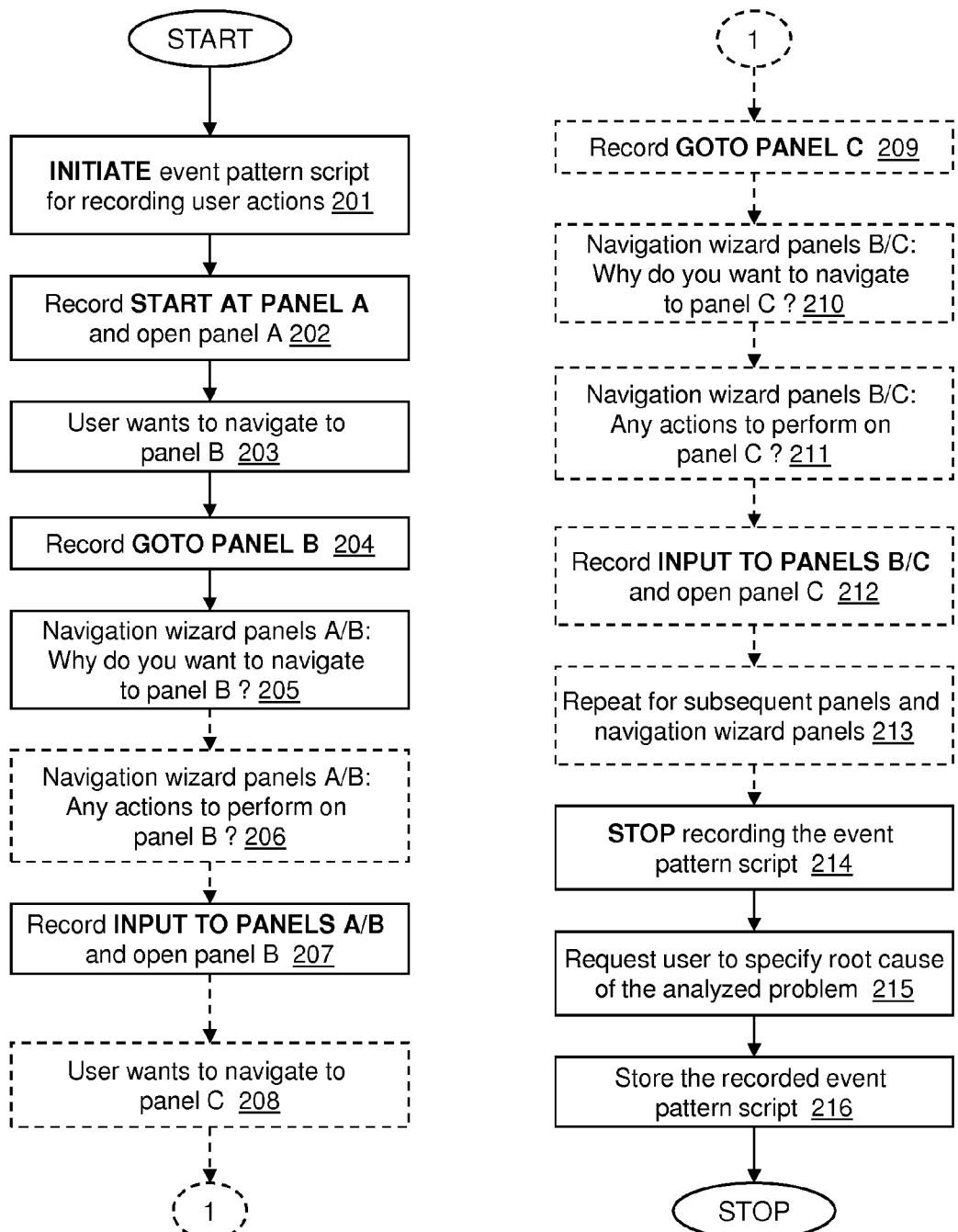
FIG. 2 illustrates a flow chart of recording an event pattern script according to an embodiment of the present invention.

In some embodiments, to create the scripts, a monitoring application needs an event pattern script (EPS) recorder, which may be part of the front-end of the monitoring application or part of its back-end. FIG. 2 illustrates a flow chart of one embodiment describing the recording of an event pattern script. In some embodiments, the user of the monitoring application navigates to the GUI panel A and sees monitored information indicating a specific event (for example, a DB2 database problem or another performance problem). In block 201, the EPS recorder is started to record event navigation patterns in a script file. In one embodiment, the start of the EPS recorder is manual. In other embodiments, an automatic start may be conceived that occurs once a predefined start condition is fulfilled. In block 202, the "START AT PANEL A" is recorded. Based on analysis of the user and assessment of the monitored information, the user decides in block 203 to navigate to the GUI panel B to further analyze the issue. The EPS records the user action "GOTO PANEL B" in block 204. However, in some embodiments, before GUI panel B opens, additional navigation wizard panels A/B are generated based on information about the predecessor GUI panel A and the successor GUI panel B and displayed to the user. In block 205, these navigation wizard GUI panels A/B request the user to specify triggering information regarding why he wants to navigate from the GUI panel A to the GUI panel B. Now, the user inputs in the navigation wizard GUI panels A/B, for example, "Because in the GUI panel A I saw that the value of variable X is only 40% of the value of variable Z and the value of variable Y is greater than 2000." These variables X, Y, and Z may be performance indicators or metrics of a monitoring application. In some embodiments, the navigation wizard GUI panels may optionally ask the user in block 206 whether any actions are to be performed on the successor GUI panel B. The user may provide corresponding action-related information. Blocks and arrows indicated by dashed lines are optional. In block 207, this triggering information and optional action-related information is stored in the event pattern script file along with the navigation action (GUI panel A->GUI panel B) and GUI panel B is displayed. The question about the navigation cause is asked at least some of the time once the user navigates from one GUI panel to another and the corresponding answer of the user is stored. Of course, the user often cannot answer these questions in a free text format. Rather, in some embodiments, the EPS recorder provides a structured process for the user to respond to that question. Within that structured process, the user can specify properties of the monitored system and their current values that were important for his decision to navigate to the next GUI panel. In blocks 210, 211, and 213, further navigation wizard GUI panels B/C, C/D, etc. are presented to the user when the user decides to navigate from the GUI panel B to the GUI panel C in block 208, then from the GUI panel C to the GUI panel D and so on in block 213. User navigation to subsequent GUI panels is recorded in blocks 209, 212, and 213. User actions in the navigation wizard panels in blocks 210 and 211 are recorded in blocks 212 and 213. At some point, the problem drill down is finished and the monitoring application user has understood the root cause of the problem. Then, the user stops recording the event pattern script in block 214, specifies an event description (for example, a root cause of an analyzed problem) in block 215 and saves the script in block 216.

In one or more embodiments, the event pattern script (EPS) does not only store a navigation scenario, but also stores the reasons for the navigation activities to analyze a specific event or problem. This differentiates the EPS recorder from a simple conventional script recorder, which often only stores the user actions on the GUI panels. The EPS recorder additionally stores the criteria that triggered the navigation from a predecessor GUI panel to a successor GUI panel and so on. To support this kind of conditional navigation, a formal domain model for information from a monitored system is utilized. In some embodiments, the monitored information may include properties of Information Technology resources (for example, performance-related information of a relational database management system (RDBMS)). Each of the Information Technology resources belongs to at least one information category. The EPS recorder is enriched with a model of these information categories of properties. Each of the GUI panels belongs to one or more distinct information categories. In some embodiments, this allows the EPS recorder to support the advanced behavior of the monitoring application in an optimal way when switching between information categories. In some embodiments, the knowledge about the domain model provided by the RDBMS clearly distinguishes the EPS recorder from an ordinary wizard.

Figure 3:
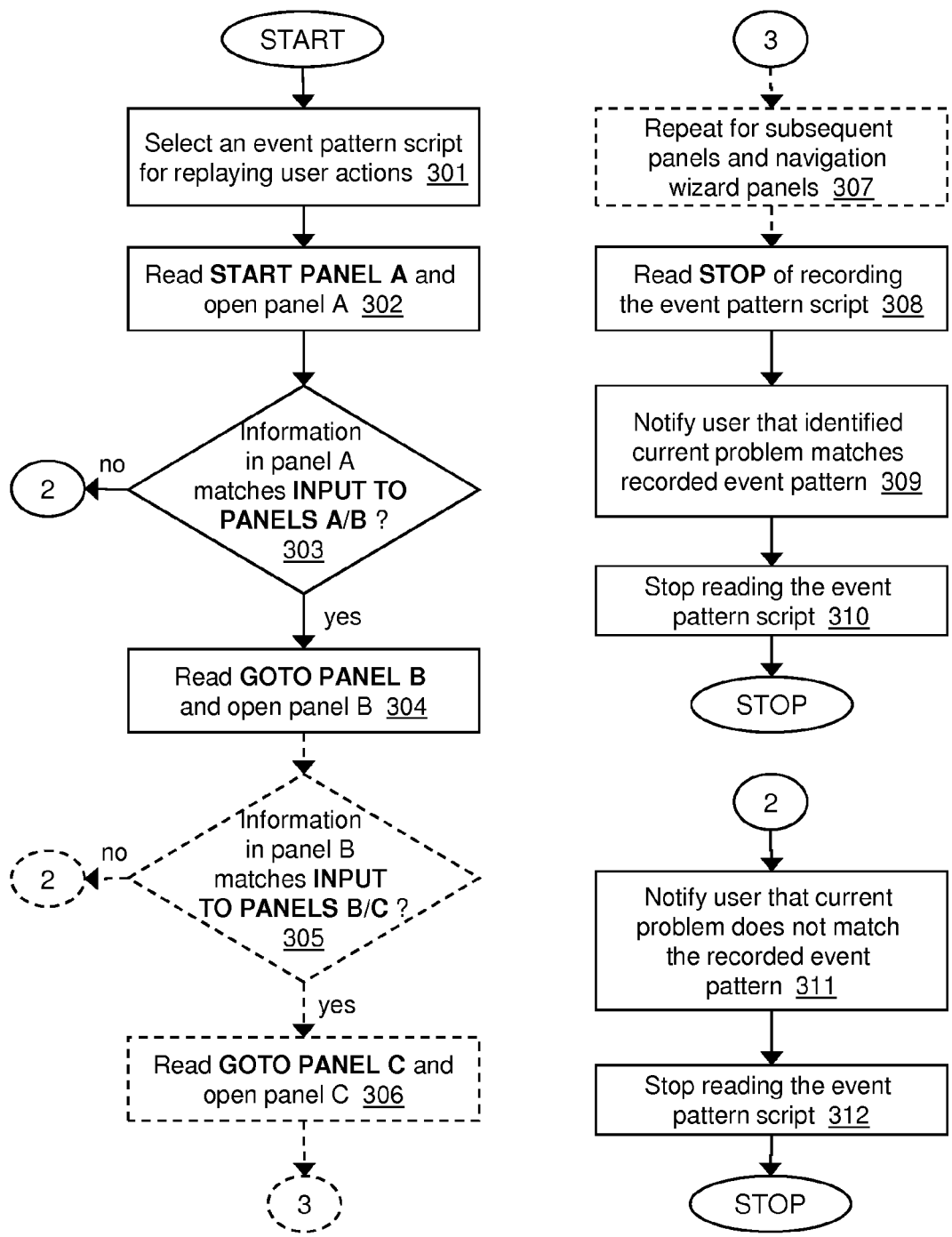
FIG. 3 illustrates a flow chart of replaying an event pattern script according to an embodiment of the present invention.

FIG. 3 illustrates a flow chart of one embodiment describing replaying an event pattern script. This replay includes comparison of current monitored event information to the recorded event pattern script. The replay may involve real user interaction with the GUI of the monitoring application and display of GUI panels. In another embodiment, the replay may be executed as a background process independent from the GUI. In block 301, a specific event pattern script is selected for replaying user actions. The monitoring application reads the recordings "START AT PANEL A" in block 302 and opens the GUI panel A, which displays current information of the monitored system. In block 303, the monitoring application tests if at least part of this current information of the GUI panel A matches input of the user to the navigation wizard GUI panels A/B, which was recorded under "INPUT TO PANELS A/B." If the answer of block 303 is "no", processing continues via connection element 2. In some embodiments, the user is notified in block 311 that the current problem event does not match the recorded event pattern. The monitoring application stops reading the event pattern script in block 312. If the answer of block 303 is "yes", processing continues at block 304. The next recorded monitor command "GOTO PANEL B" is read and the GUI panel B is opened. In one embodiment, in block 305, the monitoring application tests again if information currently displayed in GUI panel B matches the information recorded under "INPUT TO PANELS B/C" (blocks and arrows indicated by dashed lines are optional). In some embodiments, in the negative answer case, processing continues via connection element 2. Otherwise, the monitoring application continues to process the next command "GOTO PANEL C" and to open the GUI panel C in block 306. Blocks 305 and 306 are repeated for subsequent GUI panels and navigation wizard GUI panels in block 307 until the monitoring application reads a STOP command from the event pattern script to stop the replay of the event pattern script in block 308. The user is notified that the identified current event or problem matches the recorded event pattern in block 309 and the reading of the event pattern script is stopped in block 310. In some embodiments, when running a background process, this process compares the current monitored information with the recorded information relating to the GUI panels and navigation wizard GUI panels.

Figure 4:
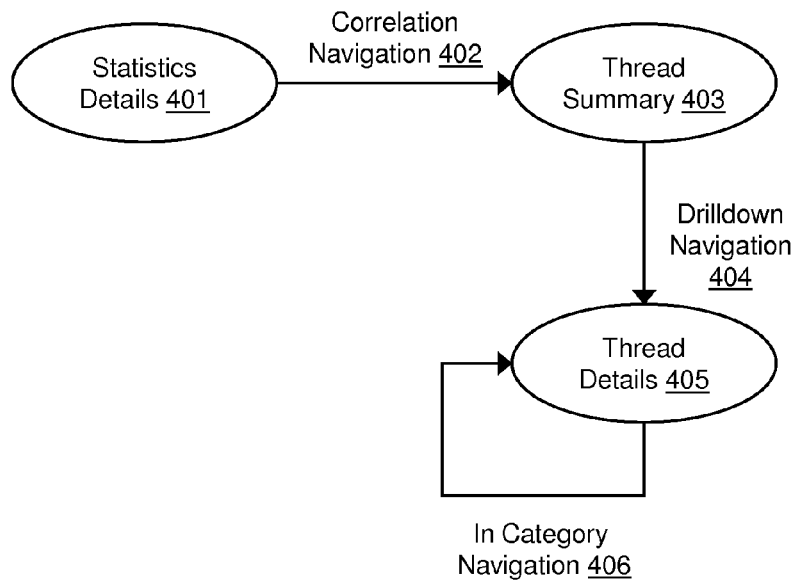
FIG. 4 illustrates a state diagram of different information categories according to an embodiment of the present invention.

FIG. 4 illustrates a state diagram of one embodiment describing different information categories, which are used, for example, in an RDBMS monitoring application, such as a DB2 performance monitor: a first category associated with information describing "Statistics Details", a second category associated with "Thread Summary" information, and a third category associated with "Thread Details" information. Each of the information categories may be displayed in separate GUI panels. A simple navigation scenario begins on the GUI panels 401 for "Statistics Details." In some embodiments, these GUI panels may show, for example, the locking activity on the entire DB2 database. If a user detects a severe locking problem, he may navigate to the "Thread Summary" GUI panels 403 with correlation navigation 402 to the GUI panels 401. In some embodiments, the categories "Statistics Details" and "Thread Summary" are completely distinct. GUI panels providing information on "Statistics" only show general DB2 data, while the "Thread Summary" GUI panels shown an overview on the thread activity that is occurring in the DB2 database system. Afterwards, the user may perform a drilldown navigation 404 from the "Thread Summary" GUI panels 403 to the "Thread Details" GUI panels 405. In some embodiments, an "InCategoryNavigation" 406 is possible between various "Thread Details" GUI panels.

In some embodiments, for the EPS recorder, it is crucial to know the information category of the GUI panel the user currently looks at. It is just as important to know the information category of the GUI panel the user wants to navigate to. This knowledge of information categories is important for the EPS recorder in order to ask the user why he is leaving a first information category and entering a second one. In some embodiments, based on the requested triggering information, the EPS recorder may filter or group the information on the GUI panel that the user navigates to.

FIGS. 5 to 16 illustrate one embodiment of a sample scenario describing an analysis of castout problems in an RDBMS providing a data sharing group, such as DB2 for z/OS. A castout is a database process of writing changed pages from buffers to disks. A group buffer is a cache structure used by the data sharing group to cache data and to ensure that it is consistent for all group members. In some embodiments, the application accessing the data sharing group is an operating system process, which may include a plurality of threads. They are sharing access to a plurality of pages of a database tablespace. In some embodiments, when some of the threads change a large quantity of data, which share dependent pages in the tablespace, this may lead to continuous castouts because pre-determined group buffer castout thresholds have been violated.

Figure 5:
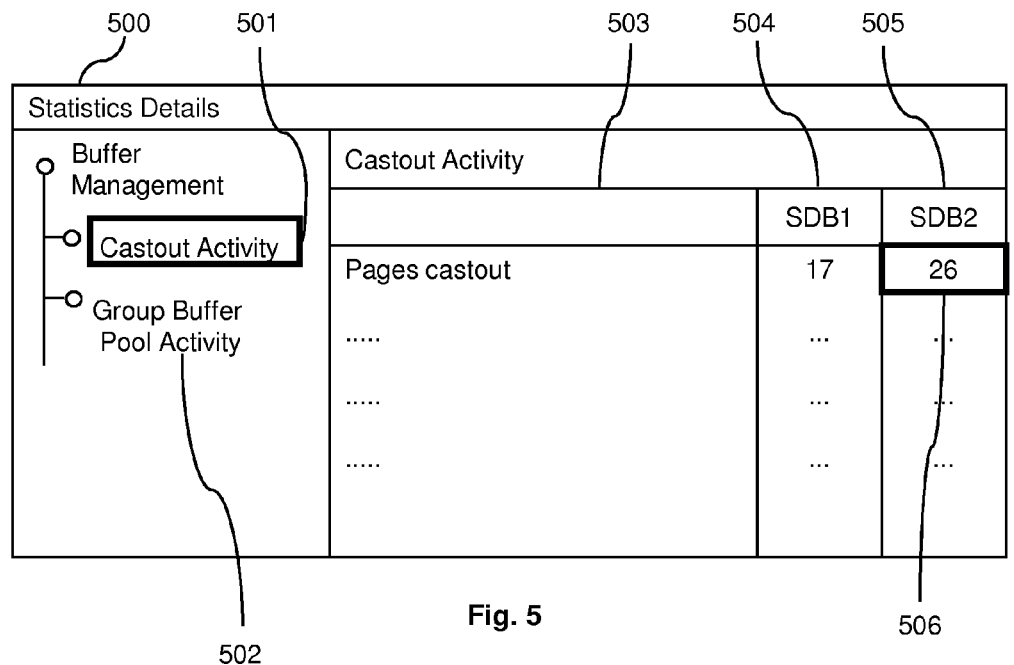

In some embodiments of the sample scenario, a database administration user wants to identify the database members that are suffering too many castout operations. FIG. 5 depicts one embodiment of a GUI panel 500 showing "Statistics Details" of a monitored database system. This GUI panel provides performance information and gives a general overview of health of a monitored system. The left-hand side navigation tree for "Buffer Management" has a "Castout Activity" node 501 and a "Group Buffer Pool Activity" node 502. In some embodiments, the castout activity is a category for performance counters associated with castouts. The user selects the "Castout Activity" node. The GUI panel displays a "Castout Activity" view on the right-hand side. Among other performance information, this view shows the performance information of the "Pages Castout" property 503 for multiple database members, for example, "SDB1" 504 and "SDB2" 505. In this GUI panel, it is the database member "SDB2", which has a pages castout value 506 of "26." To get more detailed information about the database member "SDB2", the user selects in the left-hand navigation tree the "Group Buffer Pool Activity" tree node.

In some embodiments, the monitoring application determines the information categories of the predecessor GUI panel 500 describing "CastoutActivity" and the successor GUI panel 1000 describing "Group Buffer Pool Activity." One embodiment of the latter is shown in FIG. 10. Then, the monitoring application generates a navigation GUI panel. FIGS. 6-9 and FIG. 15 display embodiments of elements of this generated navigation GUI panel.

Figure 6:
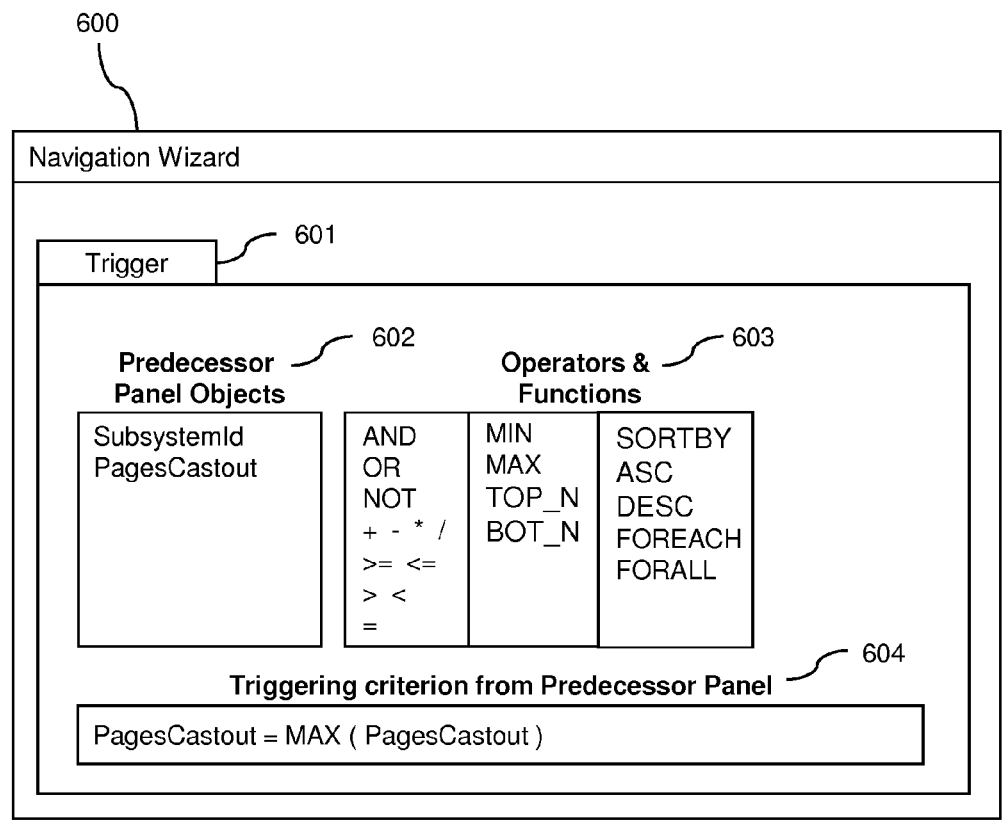

FIG. 6 shows one embodiment of the "Trigger" view 601 of the navigation wizard GUI panel 600. This view provides a selection field 602 for predecessor panel objects and a selection area 603 for operators and functions. These GUI elements assist the user to construct in the input field 604 a triggering criterion from the predecessor GUI panel. The navigation wizard GUI panels may support drag and drop, checkboxes, radio buttons, combo boxes, copy and paste, and other GUI techniques. In some embodiments, the selection of GUI elements may be a single action process (for example, when the user drags and drops a GUI element), or a double action process (for example, when the user firstly selects an element and secondly hits a confirm button). In other embodiments, the user can directly input a criterion in a text field and a syntax checker may provide corrected versions if errors are found. The triggering criterion may be represented as a logical expression, which is either true or false. The arithmetic and logical operators allow writing complex criteria. In some embodiments, a logical sub-expression may be "PagesCastout>10." MIN and MAX functions from the selection area allow the user to determine respective minima or maxima of a set of values. The TOP_N and BOT_N functions respectively determine the N largest and smallest values. For example, TOP_N(3, PagesCastout) calculates the three largest values of a set of monitored PagesCastout values. The SORTBY function sorts a set of values in a descending order, which is the default option DESC. On the contrary, the option ASC defines an ascending sort order. The operators FOREACH and FORALL are used when properties are spread over multiple GUI panels. They are explained in the example below. In the navigation wizard GUI panel 600, the user specifies in the input field 604 the triggering criterion by selecting the predecessor panel object "PagesCastout" and the MAX function to determine the sub-system with a maximum value of the "PagesCastout" property.

Figure 7:
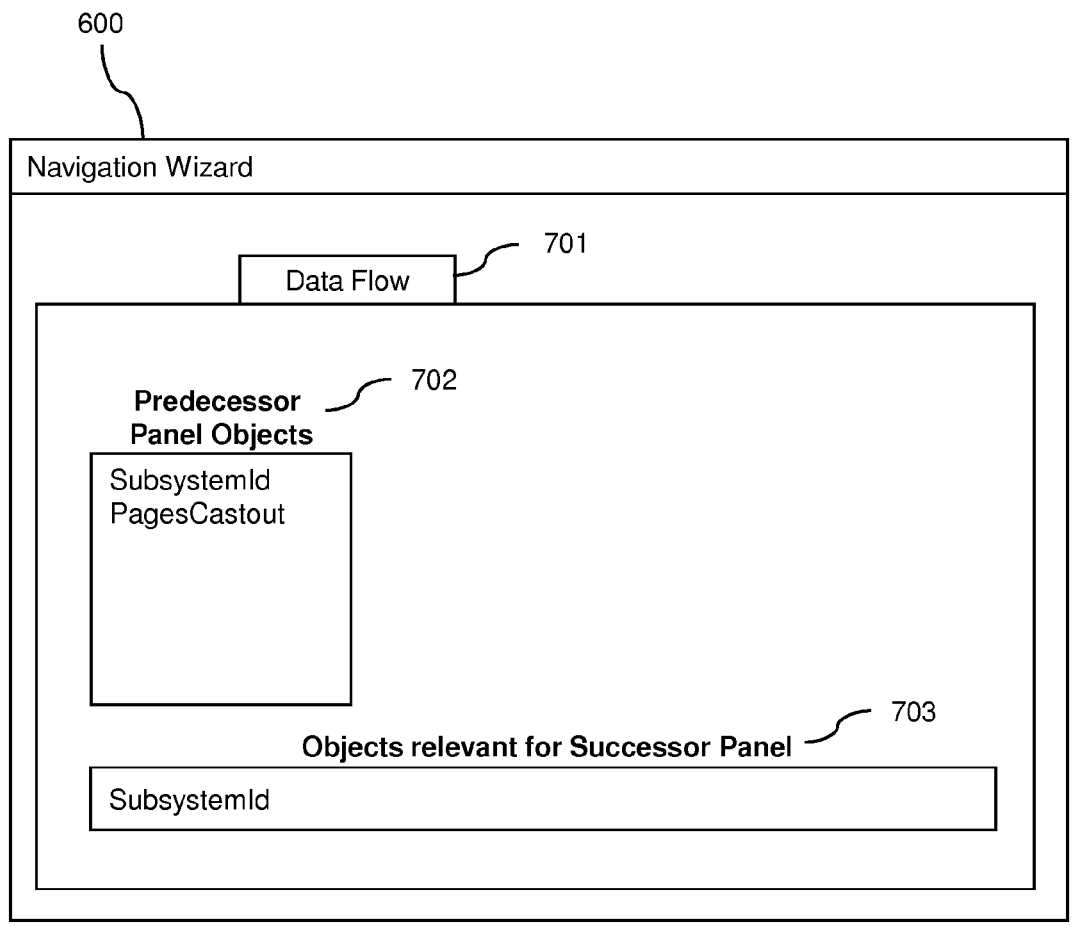

FIG. 7 shows one embodiment of the "DataFlow" view 701 of the navigation wizard GUI panel 600. The user may select a subset of elements from a list of predecessor panel objects 702 to be saved for future use on successor GUI panels. The future use is preferably not restricted to the next successor GUI panel. The element "SubsystemId" is selected as one of the "Objects relevant for Successor Panel" and entered in the input field 703. This means that the user wants to restrict the data analysis to the DB2 subsystem with identifier "SDB2."

Figure 8:
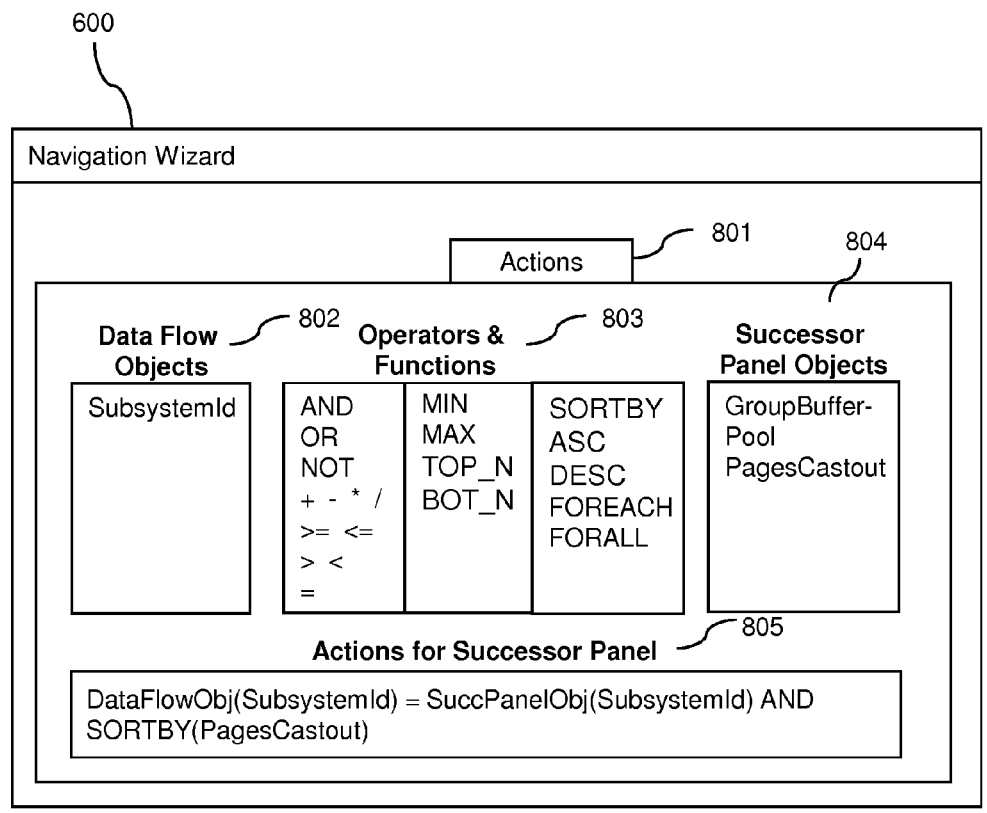

FIG. 8 illustrates one embodiment of the "Actions" view 801 of the navigation wizard GUI panel 600 to specify actions on the successor panel (for example, sorting, filtering, grouping, etc.) A first selection field 802 displays "Data Flow Objects", which have been selected in the "Data Flow" views of previous navigation wizard GUI panels. A selection area 803 provides operators and functions as explained for FIG. 7. A second selection field 804 shows successor panel objects, such as "GroupBufferPool" and "PagesCastout." In the input field 805 for "Actions for Successor Panel", the user specifies the condition "DataFlowObj(SubsystemId)=SuccPanelObj (SubsystemId)." It means that a previous filter criterion on the property "SubsystemId" will be applied to the successor GUI panel. Thus, in some embodiments, the successor GUI panel shows only those DB2 subsystems that have the same identifiers as defined by the "Trigger" and the "Data Flow" views. The function "SORTBY(PagesCastout)" has an effect on the successor GUI panel by sorting multiple occurrences of the "PagesCastout" property.

Figure 9:
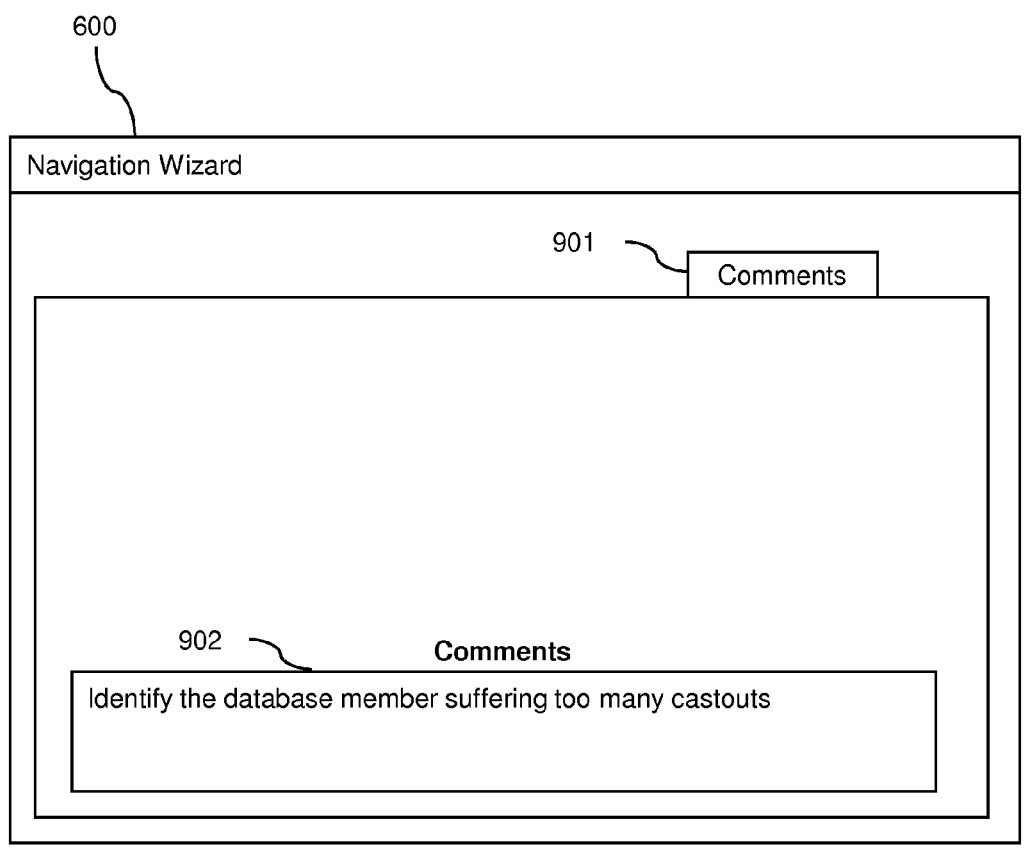

FIG. 9 illustrates one embodiment of the "Comments" view 901 of the navigation GUI panel 600 to input in the "Comments" field 902 a description of the problem analysis in free text form (for example, "Identify the database member suffering too many castouts").

In some embodiments, after the user has specified the information in the navigation wizard GUI panel 600 and has confirmed, the monitoring application presents the GUI panel 1000 with title "Statistics Details for SDB2" as shown in one embodiment in FIG. 10. This GUI panel has on the right-hand side the requested view 1002 with title "Group Buffer Pool Activity." The user analyzes the presented information to identify the group buffer pool suffering the most castout operations. The user finds in the "PagesCastout" column 1004 the maximum value 1005 of "PagesCastout=25." Column 1003 shows the corresponding identifier "GroupBufferPool=GBP0."

Figures 12, 13:
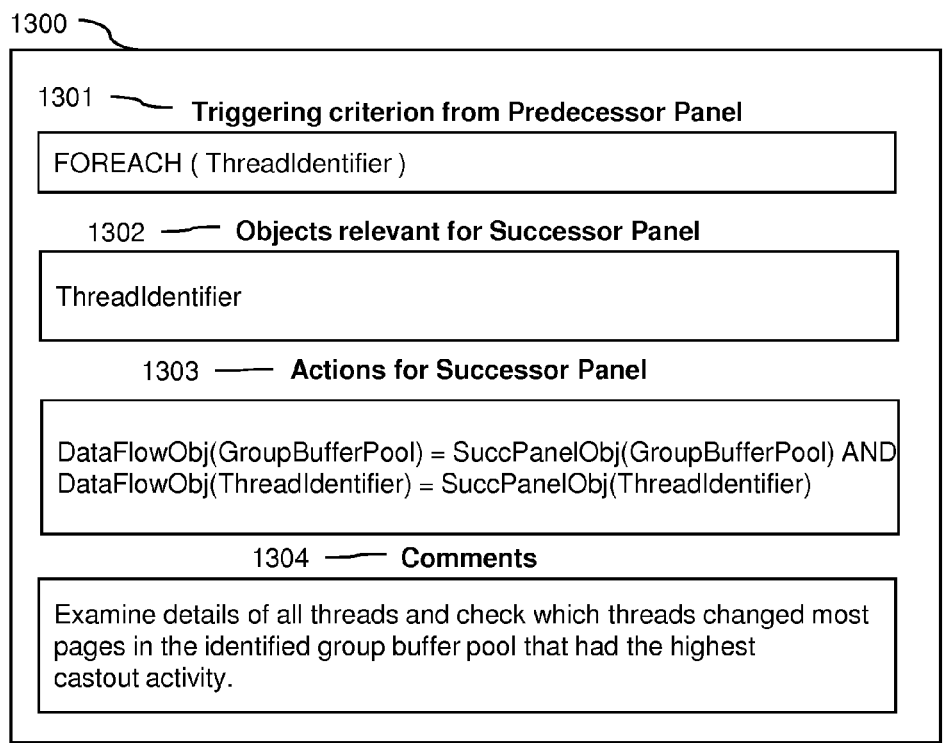

In some embodiments, from a main navigation panel or toolbar, which is not shown in the present disclosure, the user selects an option to display a further GUI panel 1200 with title "Thread Summary" as shown in one embodiment in FIG. 12. This selection involves a domain switch from the "Statistics" information category to the "Thread Summary" information category.

In some embodiments, before the selected GUI panel 1200 is shown, a further navigation wizard GUI panel 1100 is opened as illustrated in one embodiment in FIG. 11. This navigation wizard GUI panel has been determined based on category information of the GUI panels 1000 and 1200. For simplicity, only the input fields of the navigation wizard GUI panel 1100 are illustrated in one embodiment in FIG. 11. The user specifies in the input field 1101 the same triggering criterion as in the navigation wizard GUI panel 600. In some embodiments, the triggering criterion restricts display of further GUI panels to entries with a maximum "PagesCastout" value. In the GUI panel 1000 with title "Statistics Details for SDB2", this is the record for the group buffer pool with identifier "GBP0." The following "Objects relevant for Successor Panel" are specified in the input field 1102: "SubsystemId" and "GroupBufferPool." In the input field 1103, the user specifies "Actions for Successor Panel." In some embodiments, this includes: (1) the selection of the "SubsystemId" value from previous GUI panels, (2) filtering the topmost three entries with highest values of the property "ChangedPagesWrittenToGBPs", and (3) sorting these entries in a descending order. In the input field 1104, a comment reads "Identify the top-3 database threads changing the most pages across all group buffer pools and running on the selected database member." The user confirms in order to finish working on the navigation wizard GUI panel 1100. Subsequently, the GUI panel 1200 is displayed.

FIG. 12 illustrates one embodiment of the GUI panel 1200 with title "Thread Summary", which shows filtered information about database threads for the database member "SDB2." A list view 1202 of database threads shows thread identifiers 1203, database member names 1204, and changed pages in group buffer pools 1205. The list is sorted by the "ChangedPagesInGBPs" values, where the highest number is at the top. The thread with identifier "0010" seems to be responsible for the performance issues because it has the highest "ChangedPagesInGBPs" value 1206 of "20."

In an example of one embodiment, an administration user is interested in examining the details of all three threads, "0010", "0020", and "0030", and selects each thread in order to view the corresponding GUI panel, similar to the GUI panel 1400 with the title "Thread Details for 0010." Before this GUI panel is presented, the monitoring application opens the navigation wizard GUI panel 1300. FIG. 13 illustrates one embodiment of the input fields of this navigation wizard GUI panel between the GUI panels 1200 and 1400. In the input field 1301, the "Triggering criterion from Predecessor Panel" reads "FOREACH(ThreadIdentifier)." This means that details are to be examined for all determined threads even if they are displayed on separate GUI panels. In other embodiments, the user could specify filter criteria for the threads to zoom into. In one embodiment, a check is performed in order to determine which threads changed the most pages in the identified "GroupBufferPool" that had the highest "Castout Activity" value. In the input field 1302 for "Objects relevant for Successor Panel", the user enters "ThreadIdentifier" to restrict information display on future GUI panels to the determined threads. In the input field 1303 with title "Actions for Successor Panel", the user specifies filtering criteria according to the previous selection of the following "Data Flow objects" (DataFlowObj): "GroupBufferPool" and "ThreadIdentifier." In the comments field 1304, a user may specify, in one embodiment, "Examine details of all threads and check which threads changed the most pages in the identified group buffer pool that had the highest castout activity."

Figure 14:
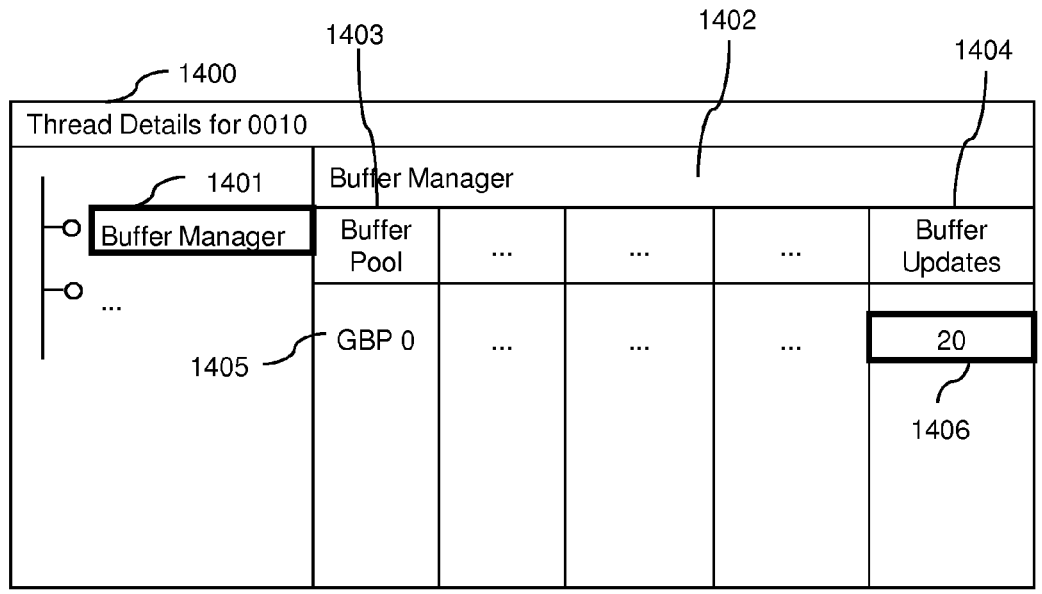

In some embodiments, after the user has finished editing the navigation wizard GUI panel 1300, the monitoring application displays all three GUI panels with titles "Thread Details for <ThreadId>", where "<ThreadId>" is replaced with one of the thread identifiers "0010", "0020", and "0030." Each GUI panel is associated with a unique "ThreadId." FIG. 14 only illustrates one embodiment of the GUI panel 1400 for the thread with thread identifier "0010." The user selects the "BufferManager" function 1401 in the left-hand navigation tree. On the right-hand side, a corresponding list view 1402 with columns "BufferPool" 1403, "BufferUpdates" 1404, and other columns is displayed. According to the previous filter criteria, only one entry 1405 for the group buffer pool "GBP0" is shown. This entry has a "BufferUpdates" value 1406 of "20." The user repeats the analysis with the GUI panels for the thread identifiers "0020" and "0030."

Figure 15:
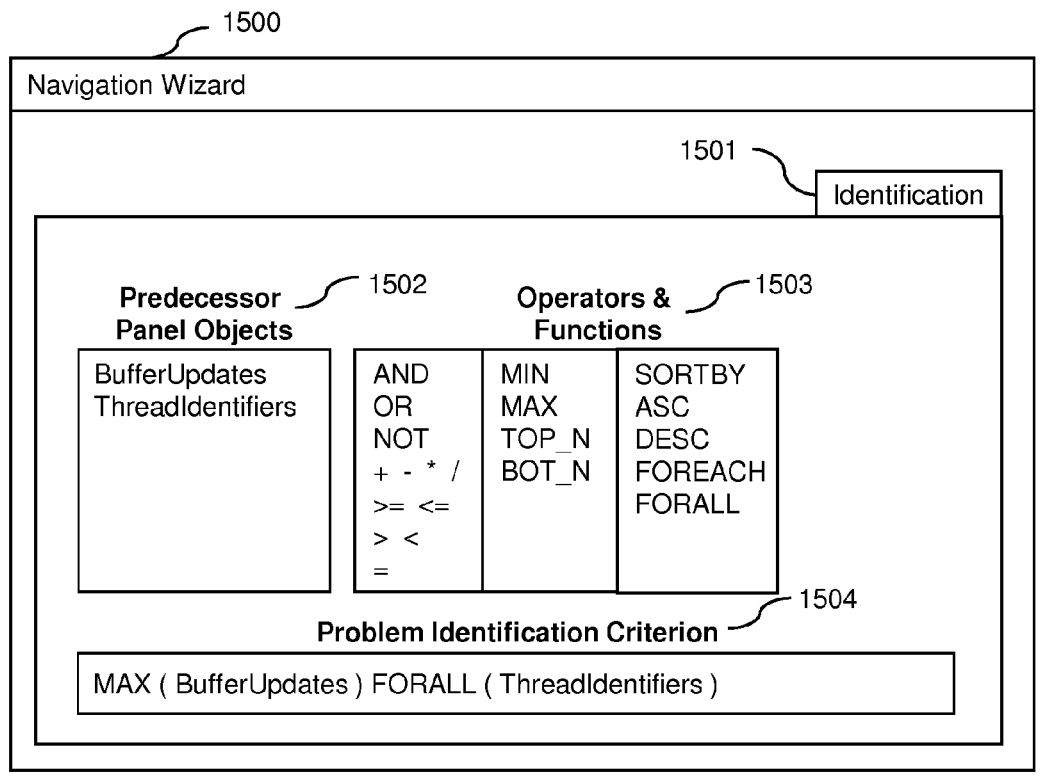

In some embodiments, at this point of the analysis, the user concludes that the problem has been identified and selects a corresponding problem identification function. This function may be provided, for example, as a button in the navigation wizard GUI panel or in the main toolbar. When this function is selected, the user may specify an identification criterion. FIG. 15 shows one embodiment of an identification view 1501 in the navigation wizard GUI panel 1500, which is similar to the "Trigger" view 601. A selection field 1502 with title "Predecessor Panel Objects" contains, for example, the objects "BufferUpdates" and "ThreadIdentifiers" among many others. A selection area 1503 for Operators and Functions is similar to previously described views. The user may specify a "Problem Identification Criterion" in the input field 1504. Here, the administrator is interested in the thread with the highest value of the "BufferUpdates" property. In some embodiments, the option "FORALL(ThreadIdentifiers)" means that this maximum value is determined based not only on a single value set from one GUI panel, but from value sets from a group of GUI panels.

In some embodiments, if any new problem occurs after recording the event pattern scripts, then the monitoring application is able to automatically analyze if the current new event or problem matches any recorded event pattern. This is possible because the event pattern script file has recorded which GUI panels contain the relevant information typical for the recorded problem and the triggering criteria of why a user decided to navigate from a predecessor GUI panel to a successor GUI panel.

In some embodiments, there are three ways to initiate the replay of the event pattern script. In one embodiment, the user manually starts the replay process, for example, by selecting a button on the GUI of the monitoring application. In another embodiment, the replay of the scripts can be triggered automatically when certain indicators of the monitored system exceed or fall below corresponding threshold values. In another embodiment, the event pattern script replay is triggered by a timer. For example, all recorded event pattern scripts may be executed every 30 minutes when triggered by a timer to check if a known event or problem exists.

In some embodiments, there are two principle ways to replay the event pattern script files: one embodiment is real interaction with the GUI of the monitoring application. When the event pattern script records navigation from the GUI panel A to the GUI panel B, then the GUI panels A and B are really opened on the computer screen. The current monitored data displayed by the GUI panel B is compared with the recorded GUI pattern for this GUI panel B. The technology of replaying recorded GUI navigation scenarios is known from automated GUI tests. In some embodiments, in these tests, currently displayed information matches certain pre-determined rules (for example, a specific displayed number is greater than zero). These conventional GUI tests often only check formal correctness of the displayed data. They often do not check the context of the data. Additionally, they often cannot identify event patterns. In another embodiment of replaying the event pattern scripts does not involve any GUI interaction in the monitoring application. The replay is often executed as a background process and is independent from the GUI. This background process often only queries from the monitored system the information that would be displayed in the GUI panels and compares this queried information with the information recorded in the event pattern script to detect potential problems.

Notice that, in some embodiments, the replay of the event pattern script file does more than simply replay the navigation scenario. On each GUI panel, the monitoring application additionally checks the contents that are displayed. If the information from the GUI panel matches criteria from the EPS, then the replay continues. If the information from the GUI does not match these criteria, then the replay of the event pattern script is stopped.

In some embodiments, when the replay of all event pattern scripts has finished, one event pattern might match the currently existing problem. In this case, a new GUI panel may be generated. This generated GUI panel contains the relevant information from all GUI panels that the matching event pattern script has passed during its replay. The relevant information that is displayed on the new generated GUI panel contains every single event pattern criterion with the matching currently observed values. For example, if the event pattern criterion for the navigation from the GUI panel A to the GUI panel B is "that the value of variable X is only 40% of the value of variable Z and the value of variable Y is greater than 2000", then the newly generated GUI panel contains the variables X, Y and Z and information about this event pattern criterion. These variables X, Y, and Z may be performance indicators or metrics of a monitoring application.

Figure 16:
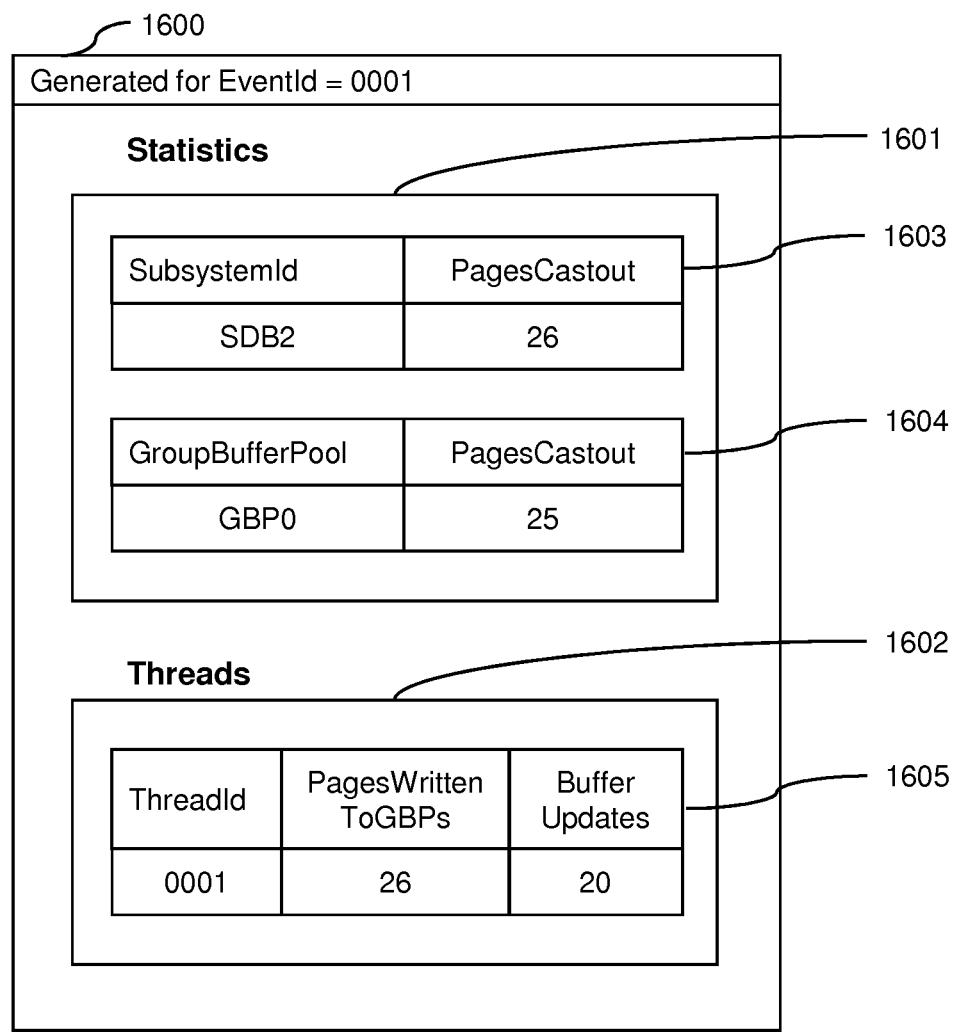
FIG. 16 illustrates a generated GUI panel of the monitoring application according to an embodiment of the present invention.

FIG. 16 illustrates one embodiment of a generated GUI panel of the monitoring application, which is based on the example recordings shown in some embodiments in FIGS. 5 to 15. The title of the generated GUI panel may refer to the event identifier "EventId=0001" of the event pattern script. The generated GUI panel has a view 1601 for the information category "Statistics" and a view 1602 for the information category "Threads." In some embodiments, the view 1601 contains two records: Record 1603 specifies the database member identified by "SubsystemId" and having the highest "PagesCastout" value. Record 1604 specifies the group buffer pool also having the highest "PagesCastout" value. View 1602 includes only one record 1605 for the thread with the highest "BufferUpdates" value and leading to the most "PagesCastout" operations on the determined database member and the determined group buffer pool. Thus, in some embodiments, the display of the generated GUI panel 1600 guides the user to the event or problem much faster and easier than the sequence of GUI panels 500, 1000, 1200, and 1400. The generated GUI panel 1600 provides the relevant information to solve the problem at one glance. In other embodiments, the monitoring application may be adapted to compact information stored in the event pattern scripts prior to replay and to generate new GUI panels based on the compacted information.

In some embodiments, a further feature that distinguishes the event pattern script recorder of the embodiments from a conventional GUI test tool is the "Rollback" operation: While analyzing a problem of the monitored system, the user is navigating along a sequence of GUI panels. At one GUI panel, the user may find that his original assumption on the root cause of the problem is wrong. The user may want to roll back the navigation scenario to a previous GUI panel and re-start investigation from there.

Figure 17:
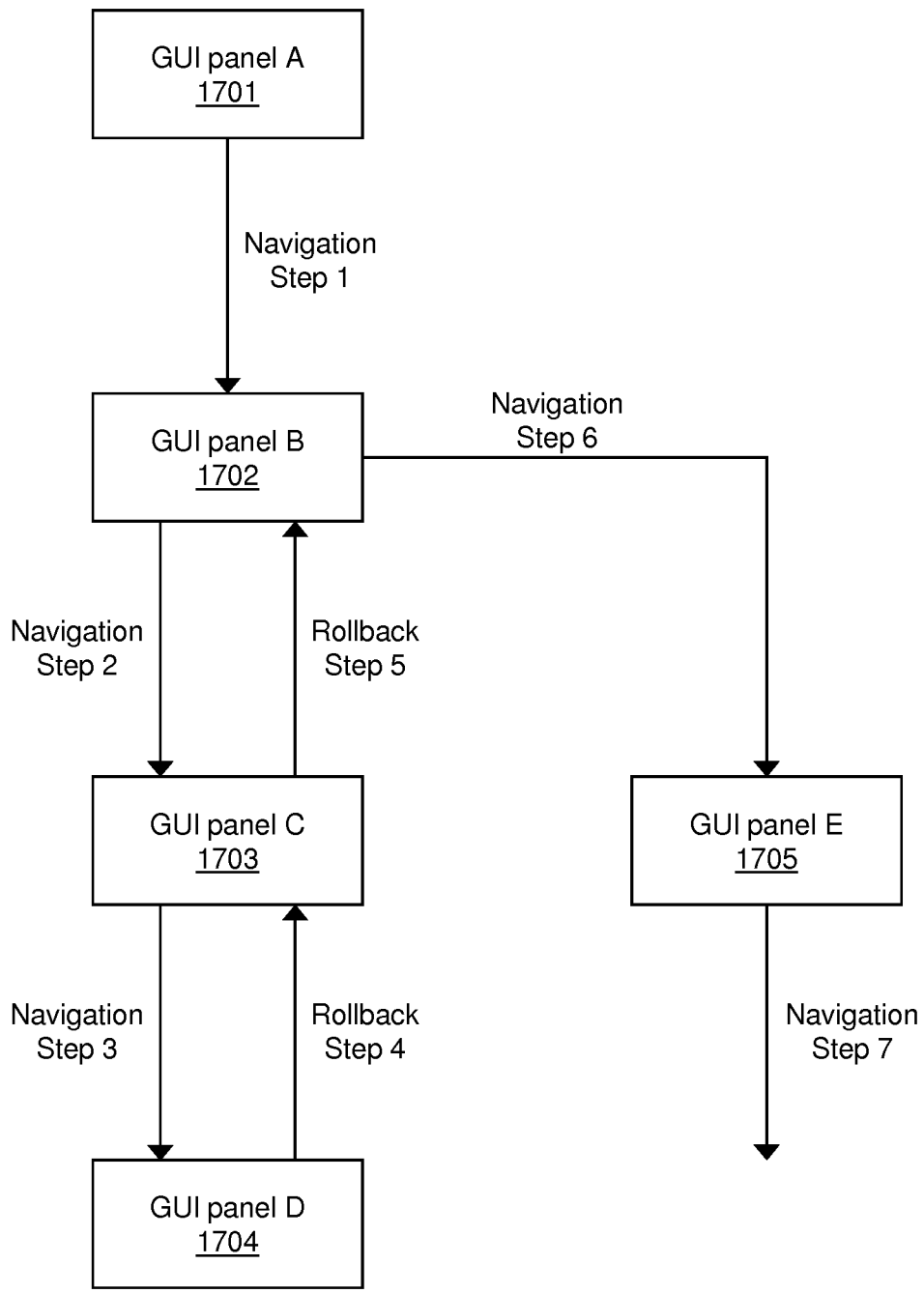
FIG. 17 illustrates a sequence diagram of GUI panels in a rollback scenario according to an embodiment of the present invention.

FIG. 17 illustrates one embodiment of a sequence diagram of GUI panels in a rollback scenario. The user starts at GUI panel A 1701 and navigates to GUI panel B 1702, GUI panel C 1703, then GUI panel D 1704. Once the user has analyzed the data on GUI panel D, he realizes that his first assumption on the problem origin is incorrect. Thus, he rolls back his navigation scenario via rollback steps 4 and 5 until he reaches GUI panel B again. From there, he goes to GUI panel E 1705 via navigation step 6 and continues the investigation of the performance problem. In some embodiments, to fully support this rollback feature, the EPS recorder implements a mechanism to delete navigation steps that were rolled back from the event pattern script. This functionality is already supported during the recording of the event pattern script navigation scenario. Thereby, in some embodiments, the event pattern script recorder is much more customizable and implements much more logic than a simple wizard tool. The event pattern script itself can be stored in an XML (Extensible Markup Language) format. XML is a set of rules for encoding documents electronically. For details, see http://www.w3.org/XML/. The XML format is widely used and XML documents can be easily processed. Many database systems including DB2 can handle XML data. The event pattern script may also be saved in any other format.

In some embodiments, the monitoring application can additionally provide utilities to edit and rearrange the recorded event pattern scripts.

In some embodiments, if a problem occurs in the future following a EPS recording, the monitoring application is able to automatically analyze if this problem matches any recorded event patterns. This is possible because the event pattern script files have recorded which GUI panels contain the relevant information that is typical for the recorded problem. Furthermore, the event pattern scripts saved the criteria to analyze the information on the relevant GUI panels properly. Thus, the monitoring application can use the saved event pattern script files in order to determine if the current problem instance is of the same kind as any recorded problem.

Figure 18:
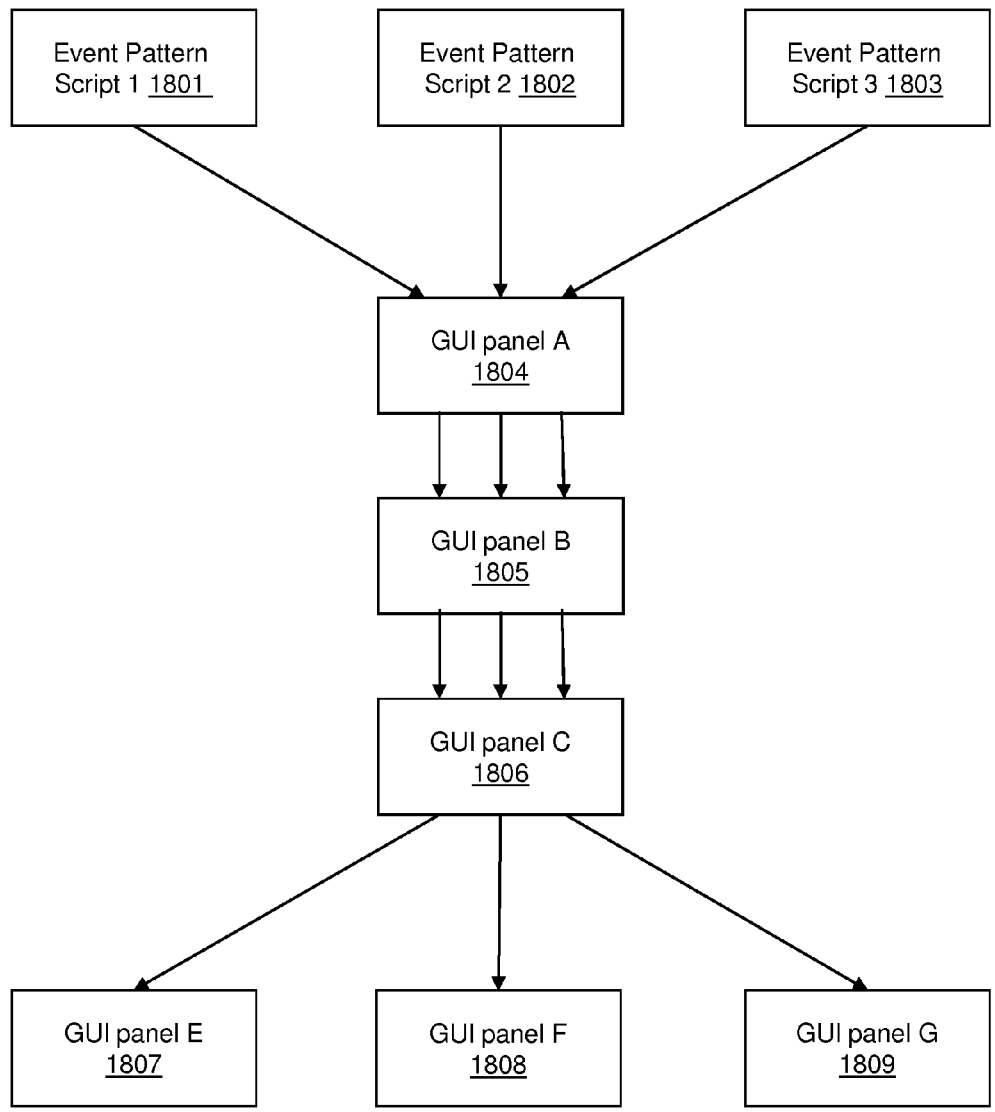
FIG. 18 illustrates a sequence diagram of GUI panels while replaying event pattern scripts according to an embodiment of the present invention.

In some embodiments, once a sufficient number of event pattern scripts have been recorded, it is possible to further analyze the navigation paths within the event pattern scripts. Thus, the monitoring application can determine which monitored information displayed on multiple GUI panels belongs together. Subsequently, the monitoring application can suggest whether to rearrange the information of the corresponding GUI panels. This optimized information arrangement and distribution on the GUI panels often cannot be pre-configured and supplied in a computer program product. It depends extremely on the specific infrastructure of a customer. In some embodiments, the analysis of a set of event pattern scripts works as follows: If many event pattern scripts have common navigation path fragments (that is, common subsets of GUI panels), then the information on these common GUI panels seems to belong together and should be grouped together on one new common GUI panel. FIG. 18 illustrates one embodiment of a simple example for GUI optimization. Consider three event pattern scripts 1801, 1802, and 1803. Each of these scripts analyzes information on GUI panel A 1804, GUI panel B 1805, and GUI panel C 1806. Thus, in some embodiments, the information on these three GUI panels is strongly correlated. The monitoring application may recommend the user to combine this information onto one common GUI panel.

An alternative embodiment of the present invention may be applied to workload management. A workload in a relational database management system (RDBMS) is a set of concurrently active applications that share common characteristics. For example, all active applications that perform online transaction processing (OLTP) on a DB2 for z/OS subsystem, abbreviated to DB2 system, might be considered as a workload. Each application within a workload uses RDBMS and operating system resources to process transactions. GUI panels are used to visualize the resource usage of each application within a workload. In the DB2 system, a database application is represented by an operating system thread. Transaction response times of the DB2 system may be categorized into three classes: Class 1 measures elapsed time of the application, class 2 refers to elapsed and processor (CPU) time in the DB2 system, and class 3 refers to elapsed wait time in the DB2 system.

An example of an embodiment is provided. Assume a workload management application having four GUI panels. A first GUI panel G1 shows long running threads, which have a class 1 elapsed time of greater than 1 second. A second GUI panel G2 only shows threads that spend more than 50% of their time in the DB2 system. For these threads, the ratio of class 2 elapsed time divided by class 1 elapsed time is greater than 50%. A third GUI panel G3 shows all DB2 threads using a great amount of CPU power. These threads spend more than 50% of their database time with processing. Specifically, their class 2 CPU time divided by their class 2 elapsed time is greater than 50%. A fourth GUI panel G4 shows DB2 threads that have not completed much work while they were using the CPU. These are threads that took more than 1 second of CPU time to process 1 SQL statement. Therefore, the class 2 CPU time divided by the SQL statement count for these threads is greater than 1 second. If a specific thread appears in all four GUI panels, G1, G2, G3, and G4, then it is a long running thread that uses the DB2 system very often and that needs a great amount of CPU time to satisfy its queries. Additionally, it takes a very long time in the DB2 system to process an average SQL statement by the application running in the thread. Thus, this application and its SQL statements are candidates for an in-depth analysis (for example, with a DB2 database explain facility). This facility provides detailed optimizer information on the access plan chosen for an explained SQL statement.

It would be helpful, in some embodiments, for a DB2 administrator to have an automatic search for this type of threads, particularly for newly developed applications. According to an embodiment, navigation wizard GUI panels displayed between each GUI panel G1, G2, G3, and G4 request that the DB2 administrator specify triggering information. Information about activated GUI panels and the triggering information are recorded in corresponding event pattern scripts. If the DB2 administrator were to detect a general performance drop on the DB2 system, then he could trigger an automatic search for the threads that show a specific performance problem by running the recorded event pattern scripts and comparing such script information with currently monitored information.

In another embodiment, an event pattern script may exist that identifies threads experiencing a lock suspension problem. This script would contain the GUI panels G1 and G2 with the same performance criteria and two additional GUI panels G5 and G6 and their associated criteria: The GUI panel G5 would contain DB2 threads with a lock suspension problem, which spend much of their time in the DB2 system in waiting. These threads are using only very small CPU time compared with the elapsed time in the DB2 system. Specifically, the ratio of class 2 CPU time divided by class 2 elapsed time is smaller than 50%. In other words, these threads spend more than 50% of their time waiting in the DB2 system. These threads are waiting for locks and latches or for an indication that the workload in the DB2 system is very high, and that there are a high number of threads that are running on the CPU. The GUI panel G6 shows all threads that are waiting for locks and latches for a very long time. Specifically, the ratio of the class 3 lock-latch time divided by the class 2 elapsed time is greater than 10% for these threads. If a thread appears in the four GUI panels G1, G2, G5, and G6, then it is a long running application that uses the DB2 system very often. However, in some embodiments, these threads do not use much CPU time because they are waiting much of the time. Therefore, when threads appear on these four GUI panels, the DB2 administrator would know to perform a locking conflict analysis.

In some embodiments, if the DB2 administrator were to automatically run the two scripts mentioned above, then he would save a great amount of time during the analysis of DB2 performance problems. More scripts would enhance the problem analysis capabilities of embodiments of the present invention and enable the DB2 administrator to quickly determine the root cause of various DB2 problems as they occur.

Figure 19:
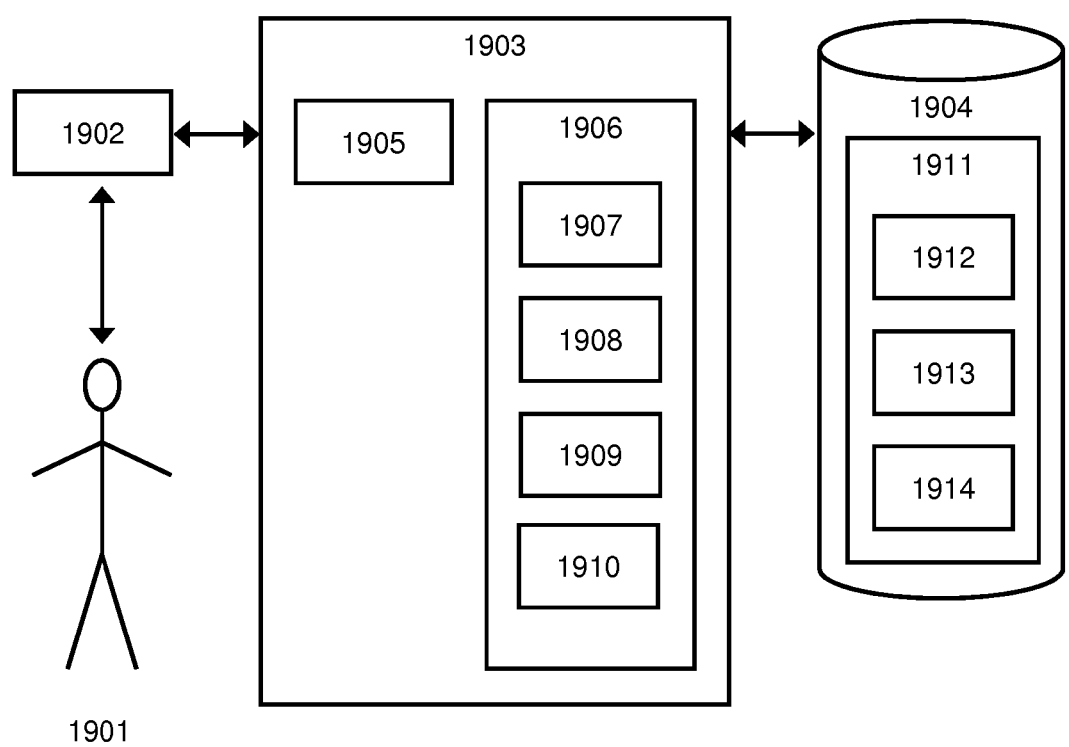
FIG. 19 illustrates a block diagram of a data processing system for providing information of a monitored system through a graphical user interface (GUI) according to an embodiment of the present invention.

FIG. 19 illustrates one embodiment of a block diagram of a data processing system for providing information of a monitored system through a graphical user interface (GUI) 1902 of a monitoring application running on the data processing system, which includes the GUI, data processing component 1903, and storage component 1904. The GUI is utilized by a user represented by symbol 1901. The GUI inputs and outputs information for the monitoring application. The data processing component has a processor 1905 and a memory 1906. The processor stores program code portions, 1907, . . . , 1910, in respective elements of the memory and, in some embodiments, executes these program code portions as follows: According to first program code portions 1907, the processor initiates an event pattern script recording. According to second program code portions 1908, the processor keeps track of user actions on the GUI and on activated GUI panels during the event pattern script recording by requesting a user to specify, at the time when the user activates a further GUI panel which panel information in a current GUI panel triggered activation of the further GUI panel and based on what criterion the triggering occurred that resulted in triggering information. According to third program code portions 1909, in response to receiving an indication that an event has been identified, the data processor stops the event pattern script recording. According to fourth program code portions 1910, the processor stores the event pattern script 1911 in the storage component. The event pattern script contains information 1912 identifying the event, information 1913 about activated GUI panels during the script recording and triggering information 1914.

The formalization of event patterns as well as the problem detection mechanism is not limited to DB2 database management systems or DB2 performance monitoring. In some embodiments, they can be used for any database management system, performance monitoring tool, and monitoring applications in general.

The terminology used herein is for the purpose of describing particular embodiments only and is not intended to be limiting the scope of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments of the invention has been presented for purposes of illustration and description, but is not intended to be exhaustive or limited to embodiments of the invention in the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the invention in various embodiments with various modifications as are suited to the particular use contemplated.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

As will be appreciated by one skilled in the art, aspects of the present embodiments of the invention may be embodied as a system, method or computer program product. Accordingly, aspects of the present embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer of the user, partly on the computer of the user, as a stand-alone software package, partly on the computer of the user, and partly on a remote computer or entirely on the remote computer or server. In the latter scenario, the remote computer may be connected to the computer of the user through any type of network, including a local area network (LAN) or a wide area network (WAN), or the connection may be made to an external computer (for example, through the Internet using an Internet Service Provider).

Aspects of the present embodiments of the invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing has been with reference to particular embodiments of the invention, it will be appreciated by those skilled in the art that changes in these embodiments may be made without departing from the principles and spirit of embodiments of the invention, the scope of which is defined by the appended claims.

What is claimed is:

1. A computer program product for providing information of a monitored system through a graphical user interface (GUI) of a monitoring application, the computer program product comprising a non-transitory computer usable storage medium to store a computer readable program that, when executed on a computer, causes a processor of the computer to perform operations comprising:
   initiating an event pattern script recording;
   keeping track of user actions on said GUI and on activated GUI panels during said event pattern script recording by requesting a user to specify, once the user activates a further GUI panel, which panel information in a current GUI panel triggered activation of said further GUI panel and based on what criterion the triggering occurred, resulting in triggering information;
   in response to receiving an indication that an event has been identified, stopping said event pattern script recording; and
   storing said event pattern script recording containing identification information identifying the event, GUI panel information about said activated GUI panels during said event pattern script recording and said triggering information.

2. The computer program product of claim 1, the operations further comprising:
   comparing script information stored in said event pattern script recording with current monitored information for determining whether said event pattern script recording matches a current event in the monitored system, wherein said comparing is triggered by at least one of the following: a user interaction, a threshold event, or a timer event; or
   replaying said event pattern script recording by displaying at least a recorded subsequence of said activated GUI panels providing the current monitored information, wherein said replaying is triggered by at least one of the following: a user interaction, a threshold event, or a timer event.

3. The computer program product of claim 1, the operations further comprising:
   providing a set of categories of monitored information and a set of actions for said categories;
   requesting the user to specify which of the actions need to be carried out for the further GUI information to be displayed in said further GUI panel before opening said further GUI panel when the user activates said further GUI panel during said event pattern script recording; and
   storing said specified actions in said event pattern script recording.

4. The computer program product of claim 1, the operations further comprising:
   compacting said stored event pattern script recording; and
   comparing said compacted information with current monitored information.

5. The computer program product of claim 1, wherein:
   said monitored information comprises properties of Information Technology resources, each said Information Technology resource belonging to a category, and said triggering information comprises filter criteria on specific properties of said Information Technology resources; or
   said monitoring application is a performance monitoring application and said event pattern script recording is related to a performance problem.

6. A data processing system for providing information of a monitored system, through a graphical user interface (GUI) on a display, of a monitoring application running on said data processing system, wherein the data processing system comprises:
   a processor, wherein the processor is configured to:
      initiate an event pattern script recording;
      keep track of user actions on said GUI and on activated GUI panels during said event pattern script recording by requesting a user to specify, once the user activates a further GUI panel, which panel information in a current GUI panel triggered activation of said further GUI panel and based on what criterion the triggering occurred, resulting in triggering information;
      in response to receiving an indication that an event has been identified, stop said event pattern script recording; and
      store said event pattern script recording containing identification information identifying the event, GUI panel information about said activated GUI panels during said event pattern script recording and said triggering information.

7. The data processing system of claim 6, wherein the processor is further configured to:
   compare script information stored in said event pattern script recording with current monitored information for determining whether said event pattern script recording matches a current event in the monitored system, wherein said compare is triggered by at least one of the following: a user interaction, a threshold event, or a timer event; or
   replay said event pattern script recording by displaying at least a recorded subsequence of said activated GUI panels providing the current monitored information, wherein said replay is triggered by at least one of the following: a user interaction, a threshold event, or a timer event.

8. The data processing system of claim 6, wherein the processor is further configured to:
   provide a set of categories of monitored information and a set of actions for said categories;
   request the user to specify which of the actions need to be carried out for the further GUI information to be displayed in said further GUI panel before opening said further GUI panel when the user activates said further GUI panel during said event pattern script recording; and store said specified actions in said event pattern script recording.

9. The data processing system of claim 6, wherein the processor is further configured to:

compact said stored event pattern script recording; and compare said compacted information with current monitored information.

* * * * *